US009203512B2

(12) United States Patent
Xia et al.

(10) Patent No.: US 9,203,512 B2
(45) Date of Patent: Dec. 1, 2015

(54) DISTINGUISHING LIGHT IN SINGLE FIBER TRANSCEIVERS

(75) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 225 days.

(21) Appl. No.: 13/556,569

(22) Filed: Jul. 24, 2012

(65) Prior Publication Data

US 2014/0029934 A1 Jan. 30, 2014

(51) Int. Cl.
*H04B 10/08* (2006.01)
*H04B 17/00* (2015.01)
*H04B 10/00* (2013.01)
*H04B 10/077* (2013.01)

(52) U.S. Cl.
CPC ................... *H04B 10/0771* (2013.01)

(58) Field of Classification Search
CPC .... H04B 10/07; H04B 10/075; H04B 10/077; H04B 10/0771; H04B 10/0791; H04B 10/0773
USPC ........... 398/135, 22, 17, 9, 16, 25, 33, 13, 20, 398/136
See application file for complete search history.

(56) References Cited

U.S. PATENT DOCUMENTS

| | | | | |
|---|---|---|---|---|
| 5,748,363 A * | 5/1998 | Duck et al. | ................. | 359/341.1 |
| 6,005,694 A * | 12/1999 | Liu | ................................... | 398/6 |
| 7,346,279 B1 * | 3/2008 | Li et al. | ........................... | 398/32 |
| 7,457,549 B2 * | 11/2008 | Koganei | ........................ | 398/197 |
| 7,684,695 B1 * | 3/2010 | Uhlhorn | .......................... | 398/10 |
| 7,689,121 B2 * | 3/2010 | Peloso et al. | .................... | 398/58 |
| 8,009,989 B1 * | 8/2011 | Gerszberg et al. | ............ | 398/115 |
| 8,675,501 B2 * | 3/2014 | Uchida et al. | ................. | 370/242 |
| 8,989,592 B2 * | 3/2015 | Bowcutt et al. | ............... | 398/151 |
| 2003/0113118 A1 * | 6/2003 | Bartur | .......................... | 398/139 |
| 2004/0156635 A1 * | 8/2004 | Felske et al. | ..................... | 398/66 |
| 2004/0208526 A1 * | 10/2004 | Mibu | ............................. | 398/33 |
| 2005/0138369 A1 * | 6/2005 | Lebovitz et al. | ............. | 713/163 |
| 2006/0077778 A1 * | 4/2006 | Tatum et al. | ............... | 369/44.11 |
| 2007/0081613 A1 * | 4/2007 | Kim et al. | ..................... | 375/327 |
| 2007/0098403 A1 * | 5/2007 | Simanonis et al. | ............ | 398/45 |
| 2009/0196622 A1 * | 8/2009 | Shin et al. | ..................... | 398/118 |
| 2010/0028014 A1 * | 2/2010 | Hosking | ....................... | 398/135 |
| 2010/0254710 A1 * | 10/2010 | Dybsetter et al. | ............ | 398/135 |
| 2011/0280567 A1 * | 11/2011 | Lyon et al. | ..................... | 398/10 |
| 2012/0008939 A1 * | 1/2012 | Yang et al. | ..................... | 398/17 |
| 2012/0099860 A1 * | 4/2012 | Zami et al. | ..................... | 398/45 |
| 2012/0301137 A1 * | 11/2012 | Sakamoto | ....................... | 398/16 |
| 2013/0077968 A1 * | 3/2013 | Yang | .............................. | 398/45 |
| 2013/0230326 A1 * | 9/2013 | Hu et al. | ........................ | 398/67 |

OTHER PUBLICATIONS

ITU-T, G.709 Interfaces for the optical transport network, Feb. 2012, International Telecommunication Union, G.709/Y.1331, pp. 67-83.*

* cited by examiner

*Primary Examiner* — David Payne
*Assistant Examiner* — Pranesh Barua (57) ABSTRACT

An optical transceiver may include logic configured to incorporate a first identifier into a first optical signal and transmit the first optical signal on an optical link. The logic may be further configured to receive a second optical signal via the optical link; retrieve a second identifier from the received second optical signal; determine whether the first identifier matches the second identifier; and report that the optical link is associated with a faulty connection, when the first identifier matches the second identifier.

18 Claims, 9 Drawing Sheets

DISTINGUISHING LIGHT IN SINGLE FIBER TRANSCEIVERS

BACKGROUND INFORMATION

Communication devices may communicate using optical signals. For example, a first communication device may convert an electrical signal into an optical signal using an optical transceiver and may send the optical signal via an optical link to a second communication device. The optical link may include optical fibers connecting with optical connectors. A faulty connection may interfere with optical signals sent along the optical link. Detecting faulty connections along an optical link may be challenging.

DETAILED DESCRIPTION OF PREFERRED EMBODIMENTS

The following detailed description refers to the accompanying drawings. The same reference numbers in different drawings identify the same or similar elements.

Figure 1:
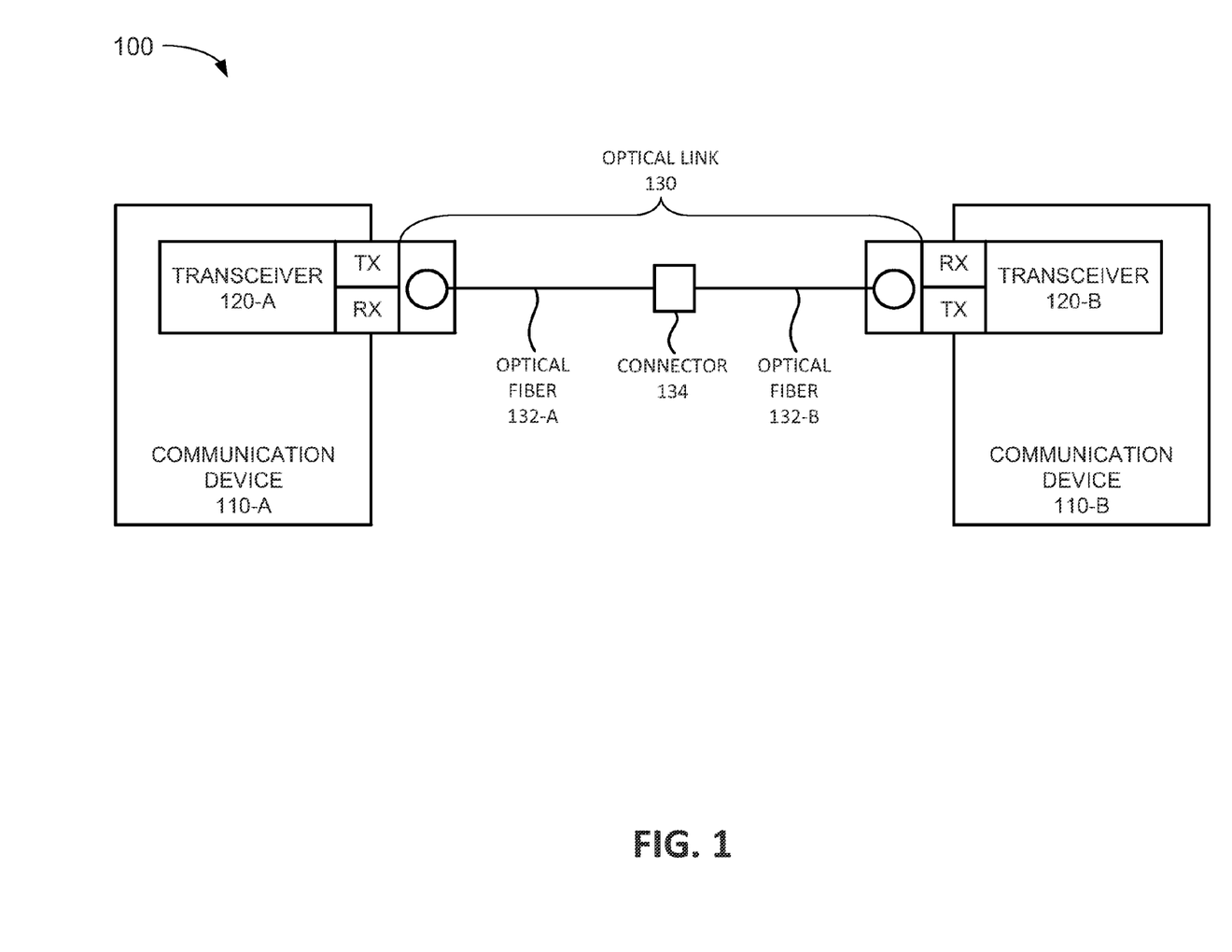
FIG. 1 is a diagram illustrating an exemplary system according to an implementation described herein.

An implementation described herein relates to distinguishing light in single fiber transceivers. FIG. 1 is a diagram of an exemplary system 100 according to an implementation described herein. As shown in FIG. 1, system 100 may include communication devices 110-A and 110-B (referred to herein collectively as "communication devices 110" and individually as "communication device 110") connected via an optical link 130.

Communication device 110 may include any device with a communication function, such as, for example, a line interface card or another type of networking component in a networking device (e.g., a switch, router, firewall, gateway, etc.), personal computer, workstation, server device, and/or another type of computing device. Communication device 110-A may include a transceiver 120-A and communication device 120-B may include a transceiver 120-B (referred to herein collectively as "transceivers 120" and individually as "transceiver 120").

Transceiver 120 may include an optical transceiver device that may convert electrical signals generated by communication device 110-A into optical signals and may send the optical signals to communication device 110-B via optical link 130. Furthermore, transceiver 120 may receive optical signals from communication device 110-B via optical link 130, may convert the received optical signals into electrical signals, and may provide the electrical signals to communication device 110-A. In one implementation, transceiver 120 may include a hot-pluggable transceiver, such as, for example, a small form-factor pluggable (SFP) transceiver, a 10 Gigabit small form-factor pluggable (XFP) transceiver, C form-factor pluggable (CFP) transceiver, and/or another type of hot-pluggable transceiver. In another implementation, transceiver 120 may include another type of transceiver.

Optical link 130 may include optical fibers 132-A and 132-B (referred to herein collectively as "optical fibers 132" and individually as "optical fiber 132") and optical connector 134. Optical connector 134 may connect optical fiber 132-A to optical fiber 132-B. While FIG. 1 shows one connector 134 and two optical fibers 132 for illustrative purposes, in practice, optical link 130 may include a different number of optical fibers 132 and/or optical connectors 134.

Although FIG. 1 shows exemplary components of system 100, in other implementations, system 100 may include fewer components, different components, differently arranged components, or additional components than depicted in FIG. 1. Additionally or alternatively, one or more components of system 100 may perform functions described as being performed by one or more other components of system 100.

Figure 2:
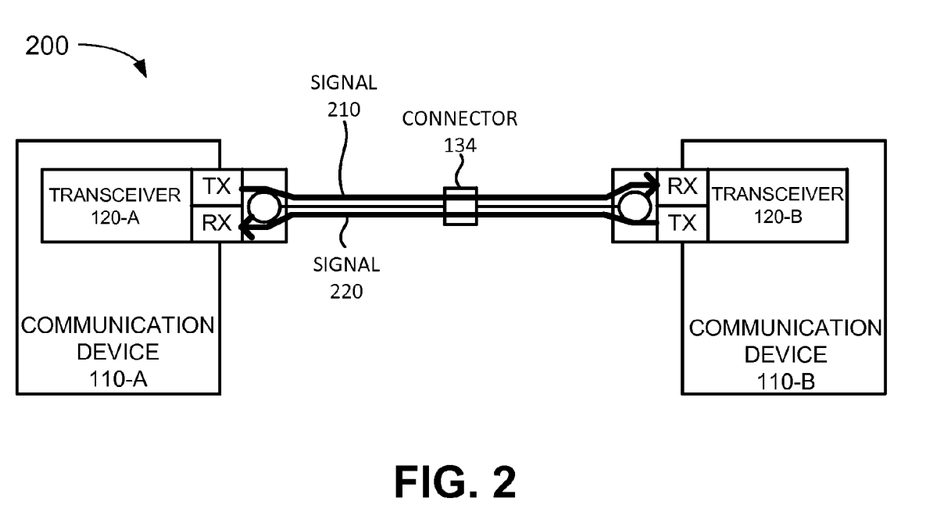
FIG. 2 is a diagram illustrating a first example of signals exchanged by transceivers according to an implementation described herein.

FIG. 2 is a diagram illustrating a first example 200 of signals exchanged by transceivers according to an implementation described herein. Example 200 illustrates an optical signal flow that may occur when optical connector 134 is functioning correctly. Transceiver 120-A may transmit optical signal 210 to transceiver 120-B through optical connector 134 and transceiver 120-B may receive optical signal 210. Transceiver 120-B may transmit optical signal 220 to transceiver 120-A through optical connector 134 and transceiver 120-A may receive optical signal 220.

Figure 3:
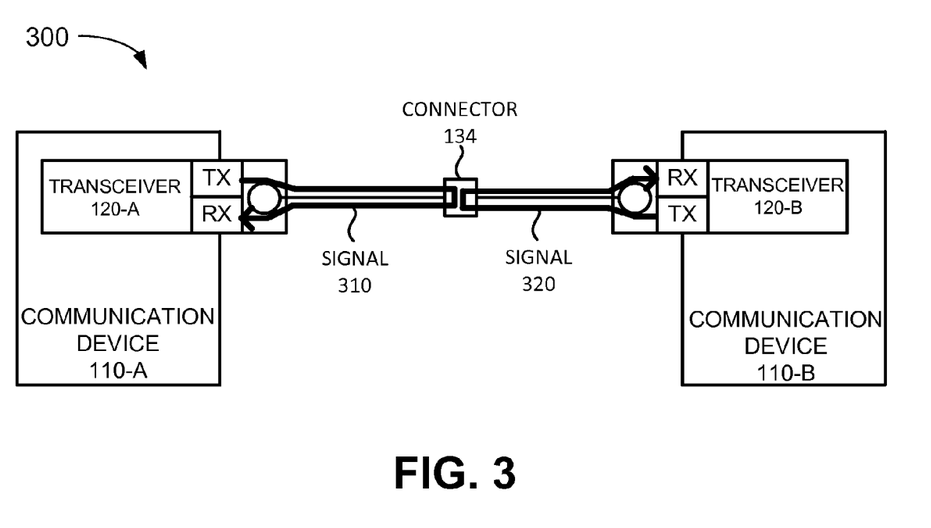
FIG. 3 is a diagram illustrating a second example of signals exchanged by transceivers according to an implementation described herein.

FIG. 3 is a diagram illustrating a second example 300 of signals exchanged by transceivers according to an implementation described herein. Example 300 illustrates an optical signal flow that may occur when optical connector 134 is not functioning correctly. For example, optical connector 134 may be unplugged or loose. However, transceivers 120-A and/or 120-B may detect a linked status with respect to optical connector 134 and may not detect any faults with respect to optical connector 134. Thus, optical connector 134 may be associated with a faulty connection, such as, for example, a false linked status, a failed link, an open link, a downed link, and/or another type of faulty connection. A false linked status may indicate that optical connector 134 is detected as being connected and yet not functioning properly.

For example, transceiver 120-A may send signal 310 to transceiver 120-B. However, signal 310 may be reflected by optical connector 134 and may be received by transceiver 120-A. Transceiver 120-A may not be able to determine that signal 310 was sent by transceiver 120-A and may interpret signal 310 as being sent by transceiver 120-B. Similarly, transceiver 120-B may send signal 320 to transceiver 120-A and signal 320 may be reflected by optical connector 134 back to transceiver 120-B and transceiver 120-B may interpret signal 320 as being sent by transceiver 120-A.

An implementation described herein relates to detecting a faulty connection in an optical link by including an identifier, stored in a memory associated with an optical transceiver, in an optical signal sent by the optical transceiver. For example, the optical transceiver may incorporate an identifier into an optical signal and may transmit the optical signal along an optical link. When the optical transceiver receives an optical signal via the optical link, the optical transceiver may retrieve an identifier from the received optical signal and may compare the retrieved identifier with the identifier stored in memory. If the retrieved identifier matches the identifier stored in the memory, the optical transceiver may determine that the optical signal has been reflected by a faulty connector and may detect a false linked status.

In one implementation, the identifier may be incorporated into an overhead field of an optical transport unit frame. For example, the identifier may be incorporated into a reserved bytes field of the overhead field. In another implementation, the identifier may be incorporated into an identifier optical frame dedicated for carrying the identifier. In yet another implementation, the identifier may be modulated onto the optical signal as a subcarrier signal.

Figure 4:
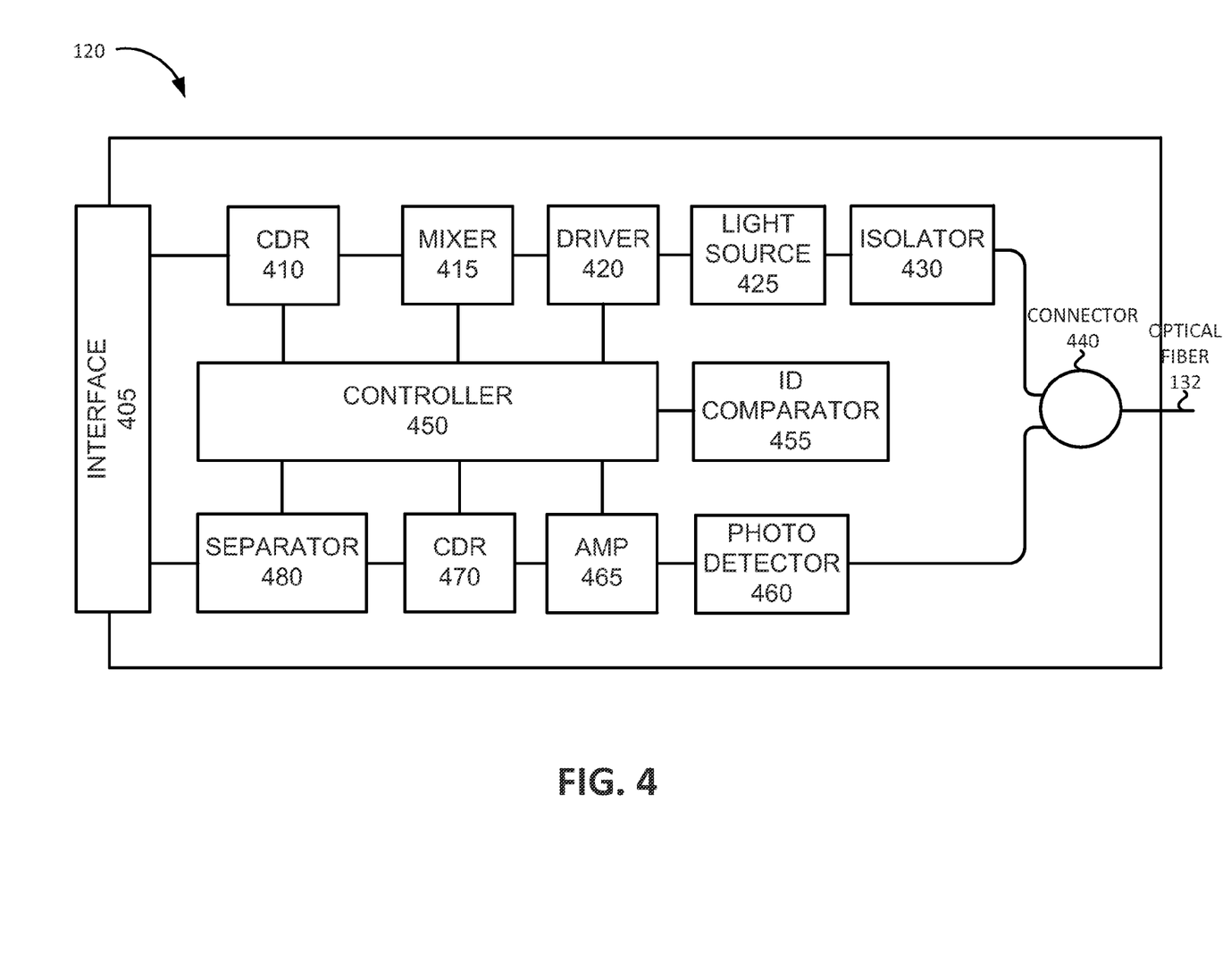
FIG. 4 is a diagram illustrating a first exemplary optical transceiver according to an implementation described herein.

FIG. 4 is a diagram illustrating a first exemplary transceiver 120 according to an implementation described herein. As shown in FIG. 4, transceiver 120 may include an interface 405, a clock and data recovery (CDR) module 410, a mixer 415, a driver 420, a light source 425, an isolator 430, a connector 440, a controller 450, an identifier (ID) comparator 455, a photodetector 460, an amplifier (AMP) 465, a CDR module 470, and a separator 480.

Interface 405 may interface communication device 110 and transceiver 120. For example, interface 405 may receive electrical signals from communication device 110 and provide the electrical signals to transceiver 120 for processing. Moreover, interface 405 may provide electrical signals, converted from optical signals received by optical connector 134 to communication device 110.

CDR module 410 may recover a clock signal from a data signal using, for example, a phased locked loop circuit. Mixer 415 may mix an ID signal into a data signal received from interface 405. Driver 420 may drive light source 425. Light source 425 may generate a light source to be sent via optical fiber 132. Light source 425 may include a laser light source, a light emitting diode (LED) light source, and/or another type of light source. Isolator 430 may isolate a particular range of frequencies from the light signal generated by light source 425. Connector 440 may connect transceiver 120 to optical fiber 132.

Controller 450 may control the other components of transceiver 120, such as CDR module 410, mixer 415, driver 420, ID comparator 455, AMP 465, CDR module 470, and/or separator 480. For example, controller 450 may control CDR module 410 to recover a clock signal from signals received from interface 405, may control mixer 415 to incorporate an ID into a signal that is to be transmitted via optical fiber 132, may control driver 420 to drive light source 425, may control AMP 465 to amplify electrical signals generated by photodetector 460, may control CDR module 470 to recover a clock signal from the amplified signals received from AMP 465, and/or may control separator 480 to retrieve an ID from the signals received via optical fiber 132.

ID comparator 455 may store an ID associated with transceiver 120 and may provide the stored ID to controller 450 to be incorporated into a signal that is to be sent via optical fiber 132. Furthermore, ID comparator 455 may compare an ID retrieved from a received optical signal with the stored ID to determine whether the retrieved ID matches the stored ID. If the retrieved ID matches the stored ID, controller 450 may report a false linked condition for optical link 130.

Photodetector 460 may receive optical signals from optical fiber 132 and may convert the received optical signals into electrical signals. AMP 465 may amplify the converted electrical signals. CDR module 470 may recover a clock signal from a data signal using, for example, a phased locked loop circuit. Separator 480 may retrieve an ID from a received optical signal and may provide the separated ID to controller 450. Controller 450 may provide the retrieved ID to ID comparator 455 to determine whether the retrieved ID matches the stored ID.

Although FIG. 4 shows exemplary components of transceiver 120, in other implementations, transceiver 120 may include fewer components, different components, differently arranged components, or additional components than depicted in FIG. 4. Additionally or alternatively, one or more components of transceiver 120 may perform functions described as being performed by one or more other components of transceiver 120.

Figure 5:
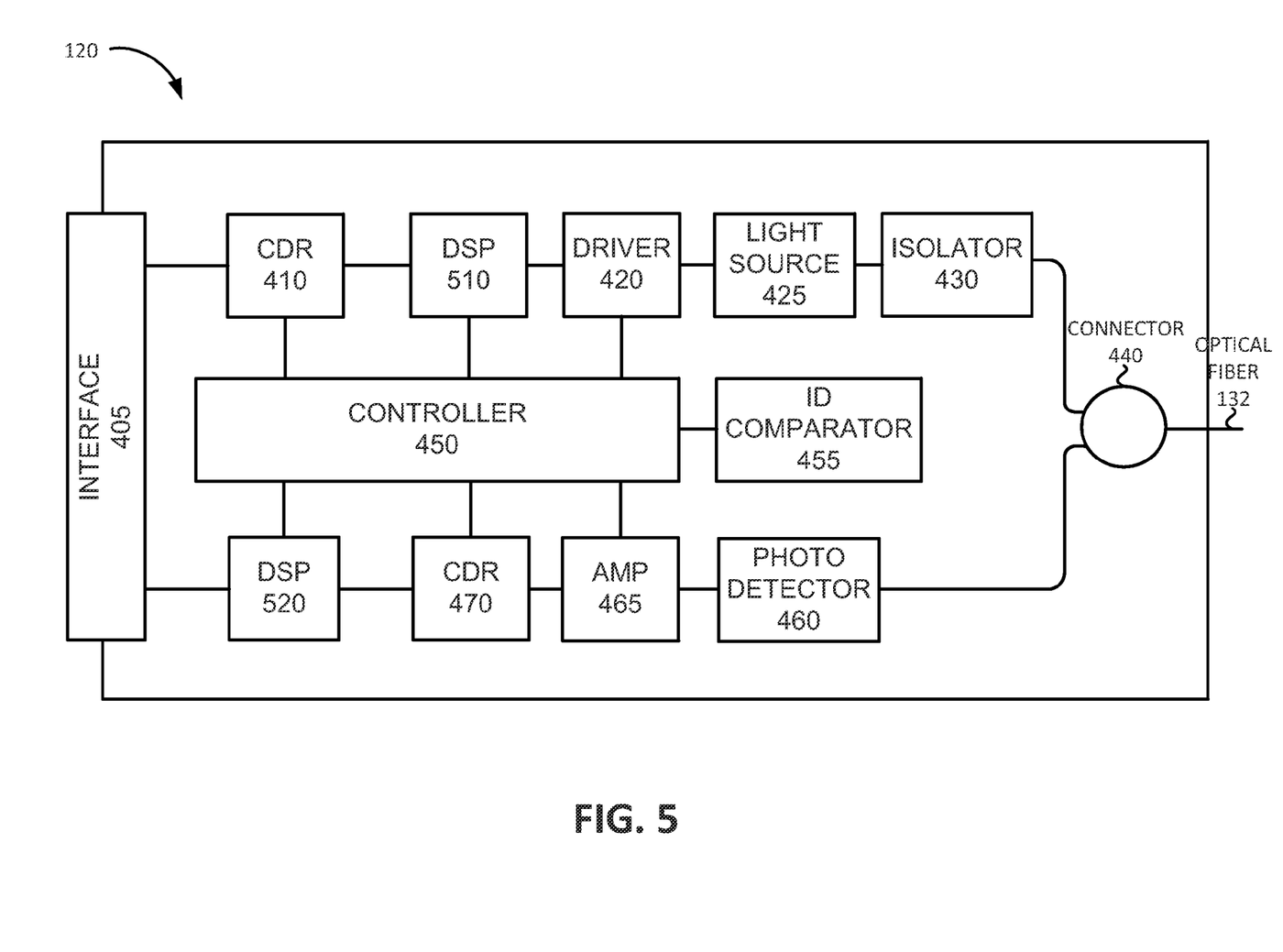
FIG. 5 is a diagram illustrating a second exemplary optical transceiver according to an implementation described herein.

FIG. 5 is a diagram illustrating a second exemplary optical transceiver 120 according to an implementation described herein. As shown in FIG. 5, transceiver 120 may include interface 405, CDR module 410, a digital signal processor (DSP) 510, driver 420, light source 425, isolator 430, connector 440, controller 450, ID comparator 455, photodetector 460, AMP 465, CDR module 470, and a DSP 520. Interface 405, CDR module 410, driver 420, light source 425, isolator 430, connector 440, controller 450, ID comparator 455, photodetector 460, AMP 465, and CDR module 470 may function as described above with respect to FIG. 4.

DSP 510 may process signals received from communication device 110 via interface 405 and may process the received signals to incorporate an ID stored by ID comparator 455 into the received signals. DSP 520 may process signals received via optical fiber 132 to retrieve an ID included in the signal received via optical fiber 132. DSP 520 may provide the retrieved ID to ID comparator 455 to determine whether the retrieved ID matches the stored ID. Controller 450 may control DSP 510 to incorporate the stored ID into a signal received via interface 405 and/or may control DSP 520 to retrieve an ID from a signal received via optical fiber 132.

Although FIG. 5 shows exemplary components of transceiver 120, in other implementations, transceiver 120 may include fewer components, different components, differently arranged components, or additional components than depicted in FIG. 5. Additionally or alternatively, one or more components of transceiver 120 may perform functions described as being performed by one or more other components of transceiver 120.

Figure 6:
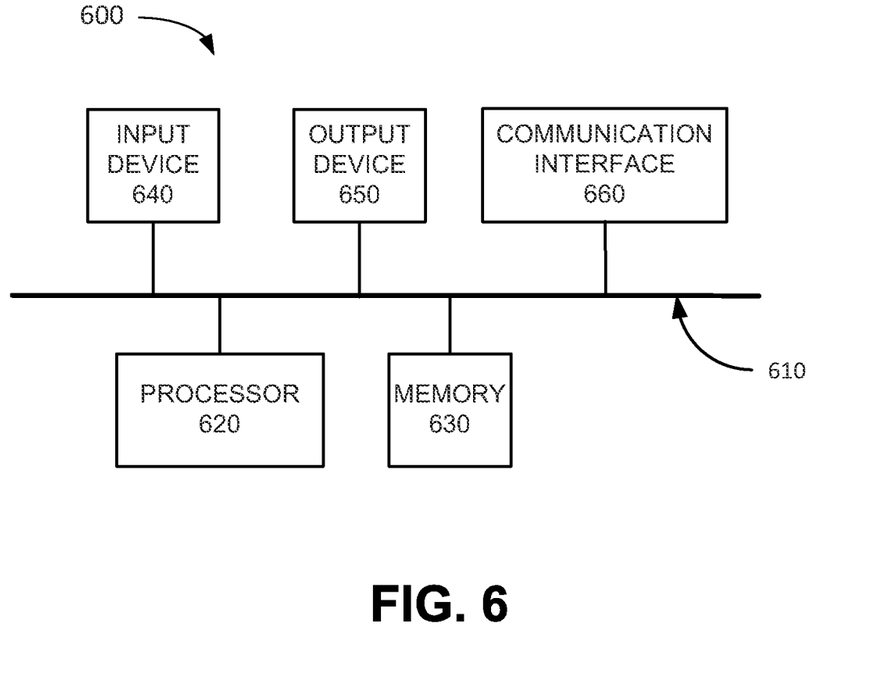
FIG. 6 is a diagram illustrating exemplary components of a device that may be included in a transceiver according to an implementation described herein.

FIG. 6 is a diagram illustrating exemplary components of a device 600 according to an implementation described herein. For example, transceiver 120 may include one or more devices 600. As shown in FIG. 6, device 600 may include a bus 610, a processor 620, a memory 630, an input device 640, an output device 650, and a communication interface 660.

Bus 610 may include a path that permits communication among the components of device 600. Processor 620 may include any type of single-core processor, multi-core processor, microprocessor, latch-based processor, and/or processing logic (or families of processors, microprocessors, and/or processing logics) that interprets and executes instructions. In other embodiments, processor 620 may include an application-specific integrated circuit (ASIC), a field-programmable gate array (FPGA), and/or another type of integrated circuit or processing logic.

Memory 630 may include any type of dynamic storage device that may store information and/or instructions, for execution by processor 620, and/or any type of non-volatile storage device that may store information for use by processor 620. For example, memory 630 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 640 may allow an operator to input information into device 600. Input device 640 may include, for example, a keyboard, a mouse, a pen, a microphone, a remote control, an audio capture device, an image and/or video capture device, a touch-screen display, and/or another type of input device. In some embodiments, device 600 may be managed remotely and may not include input device 640. In other words, device 600 may be "headless" and may not include a keyboard, for example.

Output device 650 may output information to an operator of device 600. Output device 650 may include a display, a printer, a speaker, and/or another type of output device. For example, device 600 may include a display, which may include a liquid-crystal display (LCD) for displaying content to the customer. In some embodiments, device 600 may be managed remotely and may not include output device 650. In other words, device 600 may be "headless" and may not include a display, for example.

Communication interface 660 may include a transceiver that enables device 600 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 660 may include a transmitter that converts baseband signals to radio frequency (RF) signals and/or a receiver that converts RF signals to baseband signals. Communication interface 660 may be coupled to an antenna for transmitting and receiving RF signals.

Communication interface 660 may include a logical component that includes input and/or output ports, input and/or output systems, and/or other input and output components that facilitate the transmission of data to other devices. For example, communication interface 660 may include a network interface card (e.g., Ethernet card) for wired communications and/or a wireless network interface (e.g., a WiFi) card for wireless communications. Communication interface 660 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 600 may perform certain operations relating to transmitting an ID in an optical signal and monitoring received optical signals for an ID. Device 600 may perform these operations in response to processor 620 executing software instructions contained in a computer-readable medium, such as memory 630. A computer-readable medium may be defined as a non-transitory memory device. A memory device may be implemented within a single physical memory device or spread across multiple physical memory devices. The software instructions may be read into memory 630 from another computer-readable medium or from another device. The software instructions contained in memory 630 may cause processor 620 to perform processes described herein. Alternatively, hardwired circuitry may be used in place of, or in combination with, software instructions to implement processes described herein. Thus, implementations described herein are not limited to any specific combination of hardware circuitry and software.

Although FIG. 6 shows exemplary components of device 600, in other implementations, device 600 may include fewer components, different components, additional components, or differently arranged components than depicted in FIG. 6. Additionally or alternatively, one or more components of device 600 may perform one or more tasks described as being performed by one or more other components of device 600.

Figure 7:
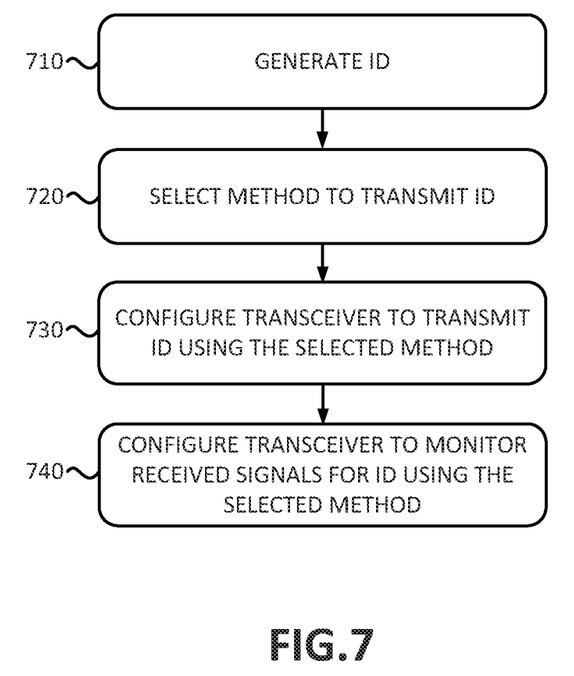
FIG. 7 is a flow chart of an exemplary process for configuring an optical transceiver to use an identifier according to an implementation described herein.

FIG. 7 is a flow chart of an exemplary process for configuring an optical transceiver to use an identifier according to an implementation described herein. In one implementation, the process of FIG. 7 may be performed by transceiver 120. In other implementations, some or all of the process of FIG. 7 may be performed by another device or a group of devices separate from transceiver 120 and/or including transceiver 120.

The process of FIG. 7 may include generating an ID (block 710). For example, ID comparator 455 may generate an ID for transceiver 120 and store the ID in a memory associated with ID comparator 455. In one implementation, the ID may be generated during manufacture of transceiver 120. In another implementation, the ID may be generated when transceiver 120 is being configured for operation. In yet another implementation, the ID may be generated at a different time.

The generated ID may be a globally unique ID, which may ensure that no two transceivers 120 are associated with the same ID. In one implementation, the ID may be generated based on an identifier associated with transceiver 120, such as, for example, a manufacturer's serial number associated with transceiver 120, a Media Access Control (MAC) address associated with transceiver 120, an Internet Protocol (IP) address associated with transceiver 120, and/or another type of identifier associated with transceiver 120. In another implementation, the ID may be selected from a global pool of IDs managed by a transceiver ID server device (not shown in FIG. 1). In yet another implementation, the ID may be generated using a different technique. The generated ID may be stored in a memory associated with ID comparator 455.

A method to transmit the ID may be selected (block 720). For example, controller 450 may select a particular method of incorporating the ID into a signal to be sent via optical fiber 132. In one implementation, controller 450 may perform the selection automatically. In another implementation, controller 450 may perform the selection based on input provided by an operator via input device 640. In one implementation, the particular method may be selected based on a type of optical transport network and/or type of transport protocol associated with transceiver 120. In another implementation, the particular method may be selected using another technique. As an example, controller 450 may select to incorporate an ID into an overhead of an optical data unit frame. As another example, controller 450 may select to generate an identifier frame that includes the ID. The identifier frame may be inserted as a frame into a sequence of data frames. As yet another example, controller 450 may select to include the ID in a data signal as a modulated subcarrier signal.

The transceiver may be configured to transmit the ID using the selected method (block 730). As an example, controller 450 may configure mixer 415 to incorporate the ID into a data signal using the selected method. As another example, controller 450 may configure DSP 510 to process a data signal to incorporate the ID using the selected method.

The transceiver may be configured to monitor received signals for the ID using the selected method (block 740). As an example, controller 450 may configure separator 480 to retrieve an ID from a received data signal using the selected method. As another example, controller 450 may configure DSP 520 to process a received data signal to retrieve an ID included in the received data signal.

Figure 8:
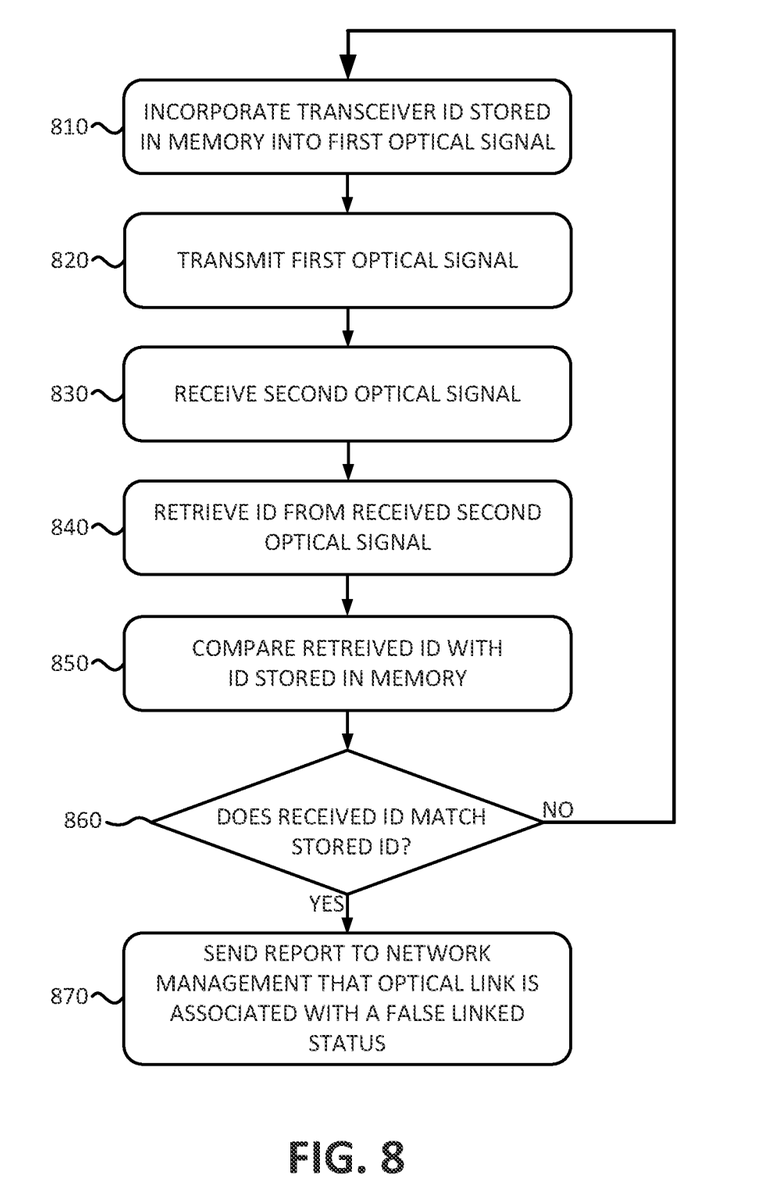
FIG. 8 is a flow chart of an exemplary process for using an identifier to detect a false linked status according to an implementation described herein.

FIG. 8 is a flow chart of an exemplary process for using an identifier to detect a false linked status, or another type of connection problem in an optical link, according to an implementation described herein. In one implementation, the process of FIG. 8 may be performed by transceiver 120. In other implementations, some or all of the process of FIG. 8 may be performed by another device or a group of devices separate from transceiver 120 and/or including transceiver 120.

The process of FIG. 8 may include incorporating a transceiver ID stored in memory into a first optical signal (block 810). For example, controller 450 may detect that data has been received by interface 405 along with a request to transmit the data via optical link 130. As an example, controller 450 may control mixer 415 to incorporate the ID into the received data. As another example, controller 450 may control DSP 510 to process the data to incorporate the ID into the received data.

In one implementation, the ID may be incorporated into an overhead field of a data frame. For example, the ID may be incorporated into a reserved bytes field of an optical transport unit frame. In another implementation, controller 450 may generate an identifier frame. The identifier frame may include an overhead field that includes an indication identifying the frame as an identifier frame and as payload field that includes the ID. The identifier frame may be transmitted at particular intervals interspersed between frames that carry the data. In yet another implementation, a data signal may be modulated to include the ID as a subcarrier signal.

The first optical signal may be transmitted (block 820). For example, controller 450 may instruct driver 420 to control light source 425 to transmit optical signals, based on the received data along with the incorporated ID, via optical fiber 132.

A second optical signal may be received (block 830). For example, photodetector 460 may convert optical signals received via optical fiber 132 into electrical data. An ID may be retrieved from the received second optical signal (block 840). As an example, separator 480 may retrieve an ID from the electrical data and may provide the retrieved ID to ID comparator 455. As another example, DSP 520 may process the electrical data to retrieve the ID and may provide the retrieved ID to ID comparator 455.

The retrieved ID may be compared to the ID stored in memory (block 850) and a determination may be made as to whether the retrieved ID matches the ID stored in memory (block 860). For example, ID comparator 455 may compare the retrieved ID with the ID stored in memory that is associated with transceiver 120.

If it is determined that the retrieved ID does not match the stored ID (block 860—NO), processing may return to block 810 to process a next signal by incorporating the transceiver ID associated with transceiver 120 into an optical signal that is to be transmitted via optical fiber 132. If the retrieved ID does not match the stored ID, the transmitted optical signal was sent correctly and was not reflected back to transmitter 120 by a faulty optical connector 134 or another type of malfunction. Thus, optical link 130 may be functioning correctly and transmitter 120 may continue to transmit optical signals via optical link 130. Additionally, transmitter 120 may If it is determined that the retrieved ID matches the stored ID (block 860—YES), a report may be sent to network management that the optical link is associated with a false linked status, a failed or down link status, an open link status, and/or another type of status indicative of a malfunctioning optical link. If the retrieved ID matches the stored ID, the transmitted optical signal may have been reflected by a faulty optical connector 134 (or by another fault associated with optical link 130). Thus, optical link 130 may be associated with a false linked status and controller 450 may generate a report about the detected false linked status and send the generated report to network management (e.g., system and/or personnel). In one implementation, controller 450 may send the generated report to communication device 110 via interface 405. In response to receiving the generated report, communication device 110 may report the reported false linked status to the user of communication device 110 via output device 650. Additionally or alternatively, if communication device 110 is associated with another optical link, or another type of link (e.g., a wireless link, an Ethernet cable, etc.), communication device 110 may send information about the generated report via the other link, using a network management and/or control plane protocol, to an entity associated with network management. Additionally or alternatively, controller 450 may activate an error indicator associated with transceiver 120 (e.g., a red LED on transceiver 120 may start blinking). In some implementations, controller 450 may shut down transceiver 120, or prevent transceiver 120 from sending or receiving optical signals, until the problem is resolved.

Figure 9:
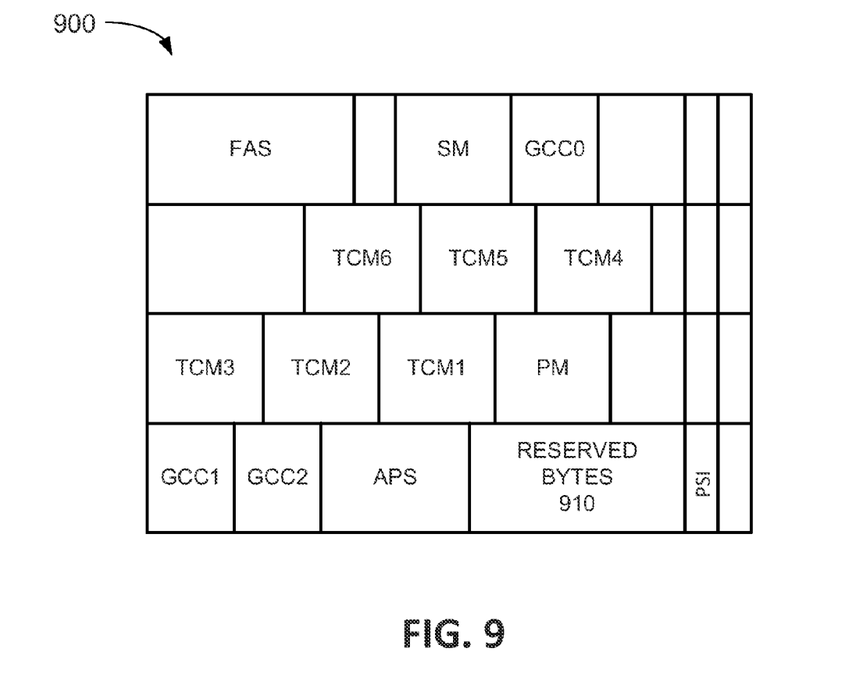
FIG. 9 is an example of a first method of transmitting an identifier according to an implementation described herein.

FIG. 9 is an exemplary optical transport unit frame 900 associated with a first method of transmitting an identifier according to an implementation described herein. Optical transport unit frame 900 may correspond to an International Telecommunications Union Telecommunication Standardization Sector (ITU-T) Recommendation G.709 Optical Transport Unit (OTU), such as OTU1, OTU2, OTU3, and/or another OTU. Optical transport unit frame 900 may include a frame alignment signal (FAS) field, a section monitoring (SM) field, a general communication channel (GCC) 0 field, a tandem connection monitoring (TCM) 6 field, a TCM5 field, a TCM4 field, a TCM3 field, a TCM2 field, a TCM1 field, a path monitoring (PM) field, a GCC1 field, a GCC2 field, an automatic protection switching (APS) field, and/or a payload structure identifier (PSI) field. Furthermore, optical transport unit frame 900 may include a reserved bytes field 910. Reserved bytes field 910 may include an ID associated with transceiver 120. For example, mixer 415 or DSP 510 may incorporate the ID stored by ID comparator 455 into reserved bytes field 910.

Figure 10:
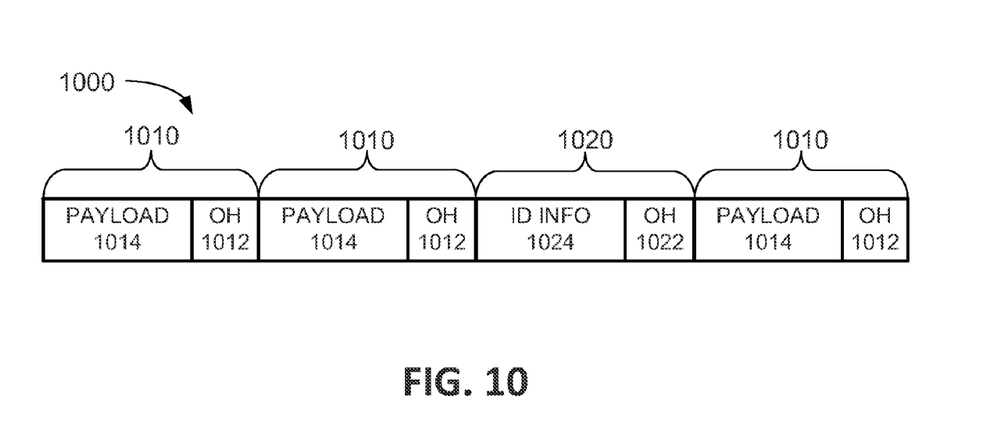
FIG. 10 is an example of a second method of transmitting an identifier according to an implementation described herein.

FIG. 10 is a signal flow 1000 associated with a second method of transmitting an identifier according to an implementation described herein. Signal flow 1000 may include data frames 1010 and an ID frame 1020. Data frames 1010 may include an overhead field 1012 and a payload field 1014. ID frame 1020 may include an ID frame overhead field 1022 and an ID frame payload field 1024. ID frame overhead field 1022 may identify ID frame 1020 as a frame that includes an ID associated with transceiver 120. ID frame payload field 1024 may include an ID associated with transceiver 120. ID frame 1020 may be inserted into signal flow 1000 at particular intervals between data frames 1010, such as between neighboring data frames, every two data frames, every three data frames, etc. Separator 480 or DSP 520 may monitor overhead fields of received frames for information indicating that a received frame corresponds to ID frame 1020. When ID frame 1020 is detected, the ID stored in the detected ID frame 1020 is retrieved.

Figure 11:
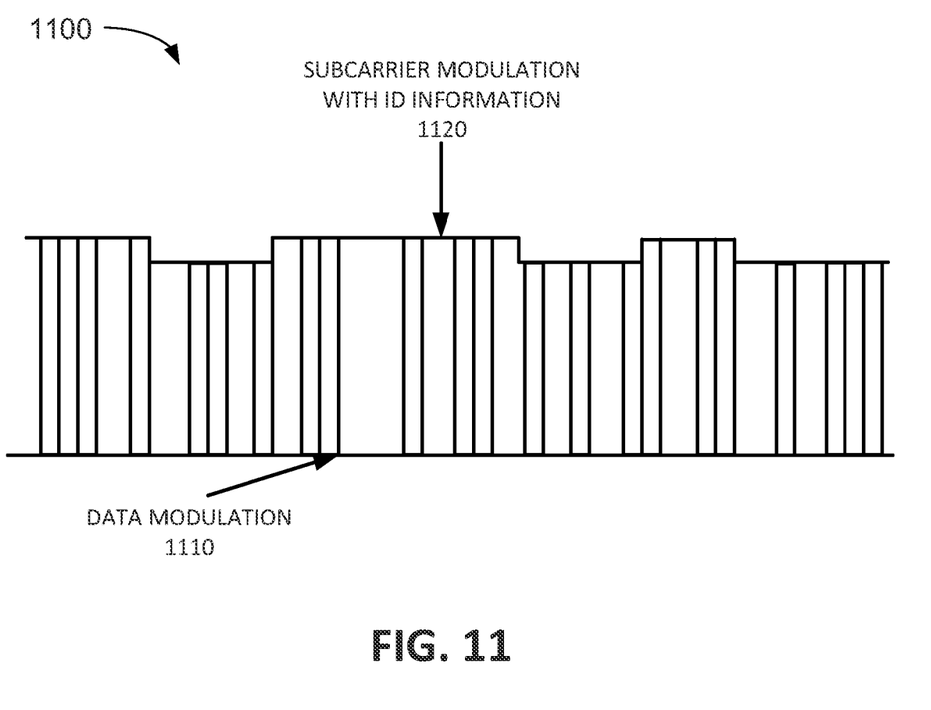
FIG. 11 is an example of a third method of transmitting an identifier according to an implementation described herein.

FIG. 11 is a signal 1100 associated with a third method of transmitting an identifier according to an implementation described herein. Signal 1100 may include a data modulation 1110. For example, data modulation 1110 may correspond to a 10 Gigabits/second Ethernet format signal. Signal 1100 may include subcarrier modulation 1120 with ID information. The ID modulation base frequency may be, for example, 1 MegaHertz, modulated on top of a wavelength range used to carry data modulation 1110.

As an example, the transceiver ID may be 8 bytes long and may be preceded by a string of bits that indicates that an ID follows the string of bits. For example, the subcarrier modulation 1120 may include the following set of bits: 1111000011110000111100001111110000+[8 byte ID]. Thus, each ID signal may be 12 bytes long and the time to identify an ID may, at 10 Gigabits/second, be 96 microseconds plus processing time. The transmission of the ID may be repeated at an interval that is equal to or larger than the time required to identify the ID.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 7 and 8, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by an optical transceiver, the method comprising:
generating a first identifier frame, wherein the identifier frame includes:
an overhead field that includes an indication identifying the first identifier frame as an identifier frame, and
a payload field that includes a first identifier;
transmitting, by the optical transceiver, the first identifier frame on an optical link;
receiving, by the optical transceiver, a second identifier frame via the same optical link;
retrieving, by the optical transceiver, a second identifier incorporated into the received second identifier frame;
determining, by the optical transceiver, whether the first identifier matches the second identifier; and
reporting, by the optical transceiver, that the optical link is associated with a faulty connection, when the first identifier matches the second identifier.

2. The method of claim 1, further comprising:
modulating the first identifier onto the first identifier frame as a subcarrier signal.

3. The method of claim 1, wherein the optical transceiver includes:
a small form-factor pluggable optical transceiver,
a 10 Gigabit small form-factor pluggable transceiver, or
a C form-factor pluggable transceiver.

4. The method of claim 1, further comprising:
generating the first identifier as a globally unique identifier.

5. The method of claim 4, wherein the globally unique identifier is based on at least one of:
a manufacturer's serial number for the optical transceiver;
a Media Access Control (MAC) address of the optical transceiver; or
a global pool of identifiers managed by a transceiver identifier server device.

6. The method of claim 1, further comprising:
transmitting the first identifier frame at particular intervals interspersed between frames that carry data.

7. A communication device comprising:
logic configured to:
incorporate a first identifier into a first reserved bytes field of a first optical transport unit; and
an optical transceiver to:
transmit the first optical transport unit on an optical link; and
receive a second optical transport unit via the same optical link;
wherein the logic is configured to:
retrieve a second identifier from a second reserved bytes field of the received second optical transport unit;
determine whether the first identifier matches the second identifier; and
report that the optical link is associated with a faulty connection, when the first identifier matches the second identifier.

8. The communication device of claim 7, wherein the logic is further configured to:
modulate the first identifier onto the first optical transport unit as a subcarrier signal.

9. The communication device of claim 7, further comprising:
a mixer configured to:
incorporate the first identifier into the first reserved bytes field of the first optical transport unit;
a separator configured to:
retrieve the second identifier from the second reserved bytes field of the second optical transport unit; and
wherein the logic is further configured to:
control the mixer to incorporate the first identifier into the first reserved bytes field of the first optical transport unit; and control the separator to retrieve the second identifier from the second reserved bytes field of the second optical transport unit.

10. The communication device of claim 7, wherein the logic includes:
a first digital signal processor configured to:
incorporate the first identifier into the first reserved bytes field of the first optical transport unit; and
a second digital signal processor configured to:
retrieve the second identifier from the second reserved bytes field of the second optical transport unit.

11. The communication device of claim 7, wherein the communication device includes:
a small form-factor pluggable optical transceiver,
a 10 Gigabit small form-factor pluggable transceiver, or
a C form-factor pluggable transceiver.

12. The communication device of claim 7, wherein the logic is further configured to:
generate the first identifier as a globally unique identifier.

13. The communication device of claim 12, wherein the logic is further configured to generate the globally unique identifier based on at least one of:
a manufacturer's serial number for the communication device;
a Media Access Control (MAC) address of the communication device; or
a global pool of identifiers managed by a transceiver identifier server device.

14. A non-transitory computer-readable medium, storing instructions executable by one or more processors, the non-transitory computer-readable medium including:
one or more instructions to generate a first identifier frame, wherein the identifier frame includes:
an overhead field that includes an indication identifying the first identifier frame as an identifier frame, and
a payload field that includes a first identifier;
one or more instructions to transmit the first identifier frame on an optical link;
one or more instructions to receive a second identifier frame via the same optical link;
one or more instructions to retrieve a second identifier from the received second identifier frame;
one or more instructions to determine whether the first identifier matches the second identifier; and
one or more instructions to report that the optical link is associated with a faulty connection, when the first identifier matches the second identifier.

15. The non-transitory computer-readable medium of claim 14, further comprising:
one or more instructions to modulate the first identifier onto the first identifier frame as a subcarrier signal.

16. The non-transitory computer-readable medium of claim 14, further comprising:
one or more instructions to generate the first identifier as a globally unique identifier.

17. The non-transitory computer-readable medium of claim 16, wherein the globally unique identifier is based on at least one of:
a manufacturer's serial number for the optical transceiver;
a Media Access Control (MAC) address of the optical transceiver; or
a global pool of identifiers managed by a transceiver identifier server device.

18. The non-transitory computer-readable medium of claim 14, wherein the first identifier frame is transmitted at particular intervals interspersed between frames that carry data.

* * * * *